United States Patent [19]
Ayusawa et al.

[11] Patent Number: 4,550,089
[45] Date of Patent: Oct. 29, 1985

[54] MICROWAVE DIELECTRIC CERAMIC COMPOSITIONS

[75] Inventors: Kazutoshi Ayusawa; Hosaku Satoh; Munetada Kazama, all of Tokyo, Japan

[73] Assignee: Oki Electric Industry Co., Ltd., Tokyo, Japan

[21] Appl. No.: 606,462

[22] Filed: May 3, 1984

[30] Foreign Application Priority Data

May 9, 1983 [JP] Japan .................. 58-79432

[51] Int. Cl.$^4$ ................ C04B 35/46; C04B 35/50
[52] U.S. Cl. ................................................. 501/139
[58] Field of Search ........................................ 501/139

[56] References Cited
U.S. PATENT DOCUMENTS 4,330,631  5/1982  Kawashima et al. ............... 501/139

FOREIGN PATENT DOCUMENTS

| 2941304 | 4/1980 | Fed. Rep. of Germany | 501/137 |
| 51-7499 | 1/1976 | Japan | 501/139 |
| 51-69200 | 6/1976 | Japan | 501/139 |
| 57-40805 | 3/1982 | Japan | 501/139 |
| 57-180007 | 11/1982 | Japan | 501/136 |

Primary Examiner—Mark L. Bell
Attorney, Agent, or Firm—Wenderoth, Lind & Ponack

[57] ABSTRACT

A microwave dielectric ceramic composition consisting of 15–19 mol % of barium oxide (BaO), 61–73 mol % of titanium dioxide ($TiO_2$), 3.5–15 mol % of samarium oxide ($Sm_2O_3$), and 1.5–15 mol % of cerium oxide ($CeO_2$). Since this composition has a high specific dielectric constant $\epsilon_r$ and a high no load value Q, it can be used as a microwave resonator, a temperature compensating capacitor or the like.

1 Claim, No Drawings

MICROWAVE DIELECTRIC CERAMIC COMPOSITIONS

BACKGROUND OF THE INVENTION

1. Field of the Invention

This invention relates to a dielectric ceramic composition for use in making microwave devices, and more particularly to a microwave dielectric ceramic composition which exhibits a high dielectric constant $\epsilon_r$ and a high no load Q value, and, in addition, a positive or negative temperature coefficient $\tau_f$ of about zero can be obtained by changing the ceramic composition.

2. Prior Art

Ceramic capacitors utilized for temperature compensation, as well as dielectric resonators for use in microwave circuits or the like have been required to have a high specific dielectric constant $\epsilon_r$ as well as a large no load value Q and further should obtain a positive or negative temperature coefficient $\tau_f$ of the resonance frequency of about zero in consideration of the temperature coefficient of metal to be used in conjunction with the dielectric ceramic composition.

As such a dielectric ceramic composition, a BaO-TiO$_2$ type, a MgO-TiO$_2$-CaO type, and a ZrO$_2$-SnO$_2$-TiO$_2$ type composition and the like have heretofore been employed. However, when a dielectric resonator or a capacitor is fabricated with these ceramic compositions, their specific dielectric constant $\epsilon_r$ becomes a low value in the order of 20-40 in the vicinity where its temperature coefficient $\tau_f$ is zero (ppm/°C.). Consequently, the size of such an oversized construction of apparatuses as dielectric resonators and the like fabricated with these materials become too large.

SUMMARY OF THE INVENTION

It is therefore an object of this invention to provide an improved dielectric ceramic composition for use in microwave circuits capable of manifesting a high specific dielectric constant $\epsilon_r$ and a high no load Q near zero (ppm/°C.) of the temperature coefficient $\tau_f$.

According to this invention there is provided a microwave ceramic composition for use in microwave circuits, comprising 15-19 mol% of BaO, 61-73 mol% of TiO$_2$, 3.5-15 mol% of Sm$_2$O$_3$ and 1.5-15 mol% of CeO$_2$.

PREFERRED EMBODIMENTS OF THE INVENTION

Preferred embodiments of the invention will be described as follows.

As starting materials, high purity BaCO$_3$, TiO$_2$, Sm$_2$O$_3$ and CeO$_2$ were weighed in accordance with the predetermined compositional ratios shown in the following Tables 1 and 2 and were mixed together with pure water in a pot mill. The mixture was dehydrated and dried. The resulting mixture was calcined at 1060° C. for 2 hours in air. The calcined product thus obtained was subjected to wet pulverization together in pure water in a pot mill. The pulverized slurry was dehydrated and dried to obtain a powder. To the powder was added a binder to obtain a granulated product, which was classified by passing the product through a 32 mesh sieve. The granulated product was molded into a circular disk having a diameter of 16 mm and a thickness of 9 mm by means of a metal mold and an oil press under a molding pressure of 1-3 tons/cm$^2$. The molded product was placed in a casing made of high purity alumina, and fired at a temperature of 1260°-1500° C. for 2 hours to produce a dielectric ceramic composition. The specific dielectric constant $\epsilon_r$ and no load value Q of the resulting ceramic composition was measured in accordance with the Hakki-Coleman method. Furthermore, the temperature coefficient $\tau_f$ of the resonance frequency was determined from the values in the temperature range of −40° C. to +80° C. on the basis of the resonance frequency at 20° C. according to the following equation (1):

$$\tau_f = \frac{f(80) - f(-40)}{f(20)} \cdot \frac{1}{\Delta T} \text{ (ppm/°C.)} \quad (1)$$

wherein f(20): resonance frequency at 20° C., f(−40): resonance frequency at −40° C., f(80): resonance frequency at 80° C., and ΔT: temperature difference, i.e. 80−(−40)=120° C. in this case.

In the above measurement, the resonance frequency was 3–7 GHz. The results of the experiments are summarized in Table 2.

TABLE 1

| Composition | Range of Composition (mol %) |
|---|---|
| BaO.(TiO$_2$)$_x$ wherein x = 3.7–4.3 | 70–95 |
| Sm$_2$O$_3$ | 3.5–15 |
| CeO$_2$ | 1.5–15 |

TABLE 2

| Sample No. | (BaO) · (TiO$_2$)$_x$ (mol %) | Sm$_2$O$_3$ (mol %) | CeO$_2$ (mol %) | $\epsilon_r$ | Q | $\tau_f$ (ppm/°C.) |
|---|---|---|---|---|---|---|
| 1* | 91 | 1.8 | 7.2 | 40 | 1500 | +130 |
| 2 | " | 3.5 | 5.5 | 55 | 2500 | +20 |
| 3 | " | 7.5 | 1.5 | 57 | 2600 | −15 |
| 4 | 83.4 | 8.3 | 8.3 | 66 | 2550 | +9 |
| 5 | " | 9.8 | 6.8 | 67 | 2000 | 0 |
| 6 | " | 13.3 | 3.3 | 68 | 1800 | −20 |
| 7 | 76.9 | 8.1 | 15.0 | 65 | 1750 | +15 |
| 8 | " | 9.2 | 13.9 | 66 | 1700 | +8 |
| 9 | " | 15.0 | 8.1 | 70 | 1600 | +15 |
| 10 | 70 | 15.0 | 15.0 | 65 | 1500 | +20 |
| 11 | 95 | 3.5 | 1.5 | 50 | 2800 | 0 |
| 12* | 83.5 | 16.5 | 0 | 64 | 1500 | −80 |
| 13* | 97 | 1 | 2 | 33 | 2700 | +20 |
| 14* | 65 | 12.5 | 22.5 | 35 | 700 | +120 |
| 15* | 84.5 | 14.5 | 1.0 | 66 | 1200 | −70 |

*Control Examples

According to the results shown in the above Tables, it has been found that there are such problems that temperature coefficient $\tau_f$ becomes high and that the dielectric constant $\epsilon_r$ becomes small, i.e., 40 or less in the case where the amount of BaO.(TiO$_2$)$_x$ has a value less than 70 mol%, and the amount of Sm$_2$O$_3$ is less than 3.5 mol%, or the amount of CeO$_2$ exceeds 15 mol%.

Furthermore, when BaO.(TiO$_2$)$_x$ exceeds 95 mol%, the dielectric constant $\epsilon_r$ becomes low. In addition, the temperature coefficient $\tau_f$ becomes too high when Sm$_2$O$_3$ exceeds 15 mol%, or CeO$_2$ is less than 1.5 mol%.

Thus, such a range that Bao: 15–19 mol%, TiO$_2$: 61–73 mol%, Sm$_2$O$_3$: 3.5–15 mol%, and CeO$_2$: 3.5–15 mol% is most suitable as a dielectric ceramic composition for microwave circuits from a practical point of view.

As is apparent from the description given above, the dielectric ceramic composition according to this invention exhibits a high specific dielectric constant $\epsilon_r$ and a high no load value Q in the microwave region. Furthermore, since the temperature coefficient $\eta_f$ can be controlled to cover a wide range by changing its composition, the composition of this invention can be efficiently utilized for microwave dielectric resonators, as capacitors for temperature compensation or the like so that the industrial usefulness of the dielectric ceramic composition in accordance with the present invention is remarkably high.

What is claimed is:

1. A microwave dielectric ceramic composition consisting of 15-19 mol% of barium oxide (BaO), 61-73 mol% of titanium dioxide ($TiO_2$), 3.5-15 mol% of samarium oxide ($Sm_2O_3$), and 1.5-15 mol% of cerium oxide ($CeO_2$).

* * * * *